(12) United States Patent
Fletcher et al.

(10) Patent No.: US 8,972,605 B2
(45) Date of Patent: Mar. 3, 2015

(54) SECURE LOCATION IDENTIFICATION SERVICE

(71) Applicant: Verizon Patent and Licensing Inc., Basking Ridge, NJ (US)

(72) Inventors: Hugh H. Fletcher, Mountain View, CA (US); Piyush Jethwa, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 232 days.

(21) Appl. No.: 13/670,905

(22) Filed: Nov. 7, 2012

(65) Prior Publication Data

US 2014/0129628 A1  May 8, 2014

(51) Int. Cl.
*G06F 15/16* (2006.01)
*H04W 24/00* (2009.01)

(52) U.S. Cl.
USPC .................. 709/245; 709/225; 455/456.1

(58) Field of Classification Search
CPC .................. H04L 12/1845; H04W 4/02–4/046
USPC .................. 709/203–207, 223–226, 245; 455/404.2, 414.2, 433, 456.1–456.6
See application file for complete search history.

(56) References Cited

U.S. PATENT DOCUMENTS

| | | | | |
|---|---|---|---|---|
| 8,150,967 | B2* | 4/2012 | King et al. | 709/224 |
| 2002/0026361 | A1* | 2/2002 | Blom | 705/14 |
| 2002/0035605 | A1* | 3/2002 | McDowell et al. | 709/206 |
| 2005/0239480 | A1* | 10/2005 | Kim et al. | 455/456.1 |
| 2008/0293379 | A1* | 11/2008 | Hinton et al. | 455/411 |
| 2009/0292464 | A1* | 11/2009 | Fuchs et al. | 701/208 |
| 2010/0112989 | A1* | 5/2010 | Andreasson | 455/414.2 |
| 2011/0183682 | A1* | 7/2011 | Harindranath | 455/456.1 |
| 2013/0059604 | A1* | 3/2013 | Zhu | 455/456.2 |

OTHER PUBLICATIONS

Population-Analytics—Better Insights, Faster and at Less Cost; http://www.airsage.com/Products/Population-Analytics/; printed Nov. 6, 2012; 4 sheets.
FastCache-Locations; http://www.airsage.com/Products/FastCache-Locations/; printed Nov. 6, 2012; 4 sheets.
Traffic-Insights—Accurate, Real-Time and Historial Traffic Data; http://airsage.com/Products/Traffic-Insights/; printed Nov. 6, 2012; 3 sheets.
How-it-works > http://www.airsage.com/Technology/How-it-works/; printed Nov. 6, 2012; 2 sheets.

(Continued)

*Primary Examiner* — Brendan Higa

(57) ABSTRACT

A first server may: receive, from a second server, a request for location information associated with a first user device having a first identifier and a second identifier, or a request for information to identify one or more second user devices located in a particular geographic area; determine the second identifier based on information stored by the first server mapping the second identifier to the first identifier; provide, to the third server, the second identifier to request the location information associated with the second identifier; receive the location information associated with the second identifier; and provide, to the second server, the location information associated with the user device based on receiving the location information. The first server may provide information regarding the geographic area to the third server to receive the information identifying the one or more user devices in the geographic area.

20 Claims, 13 Drawing Sheets

(56) References Cited

OTHER PUBLICATIONS

What-we-do—Relevant Information To Deliver Innovative Solutions; http://www.airsage.com/Technology/What-we-do/; printed Nov. 6, 2012; 3 sheets.

Coverage—Location and Traffic Data for Nearly 85% of the U.S.; http://www.airsage.com/Technology/Coverage/; printed Nov. 6, 2012; 3 sheets.

Privacy—Ensuring Data Privacy, Anonymity and Integrity; http://www.airsage.com/Technology/Privacy/; printed Nov. 6, 2012; 3 sheets.

AirSage; FastCache Location Services; printed Oct. 21, 2012; 1 sheet.

AirSage; Population Analytics; printed Oct. 21, 2012; 1 sheet.

AirSage; Traffic Insights; printed Oct. 21, 2012; 1 sheet.

\* cited by examiner

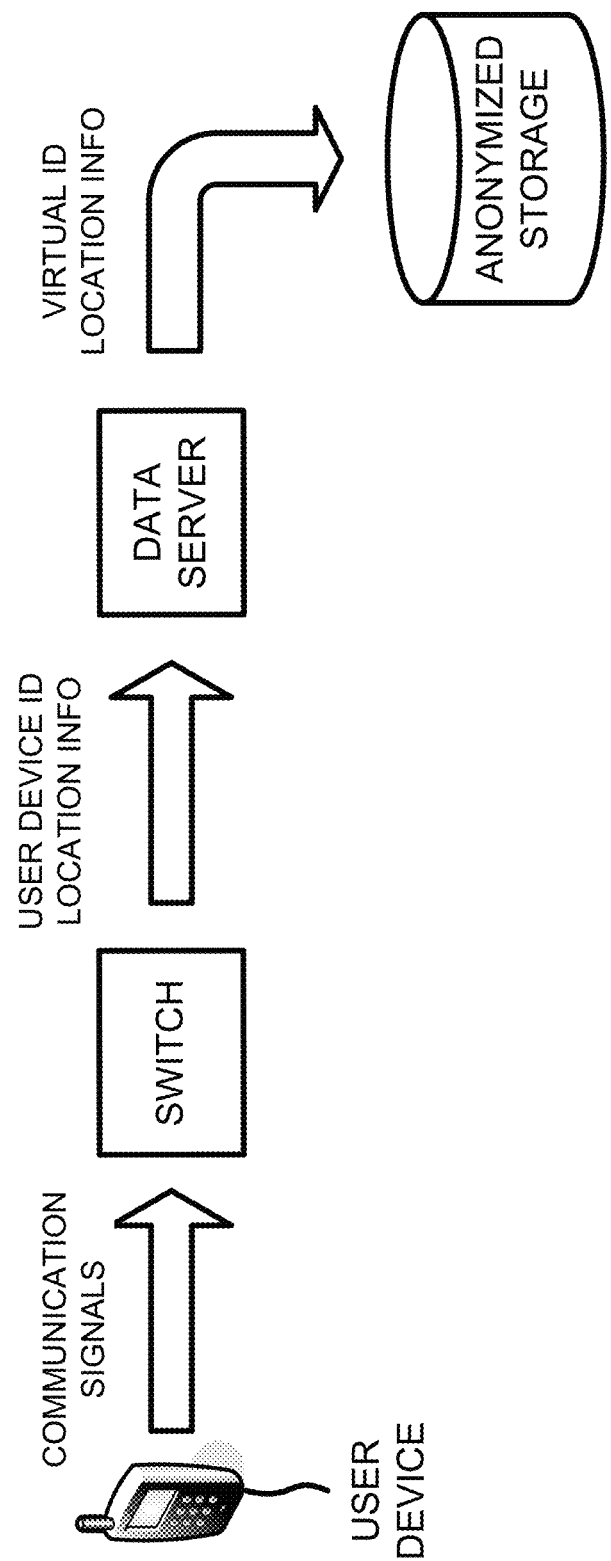

| VIRTUAL ID 560 | USER DEVICE ID 570 |
|---|---|
| 12334ABCD | 490154203237515 |
| 12335ABCE | 448487878413263 |
| ... | ... |

FIG. 5B

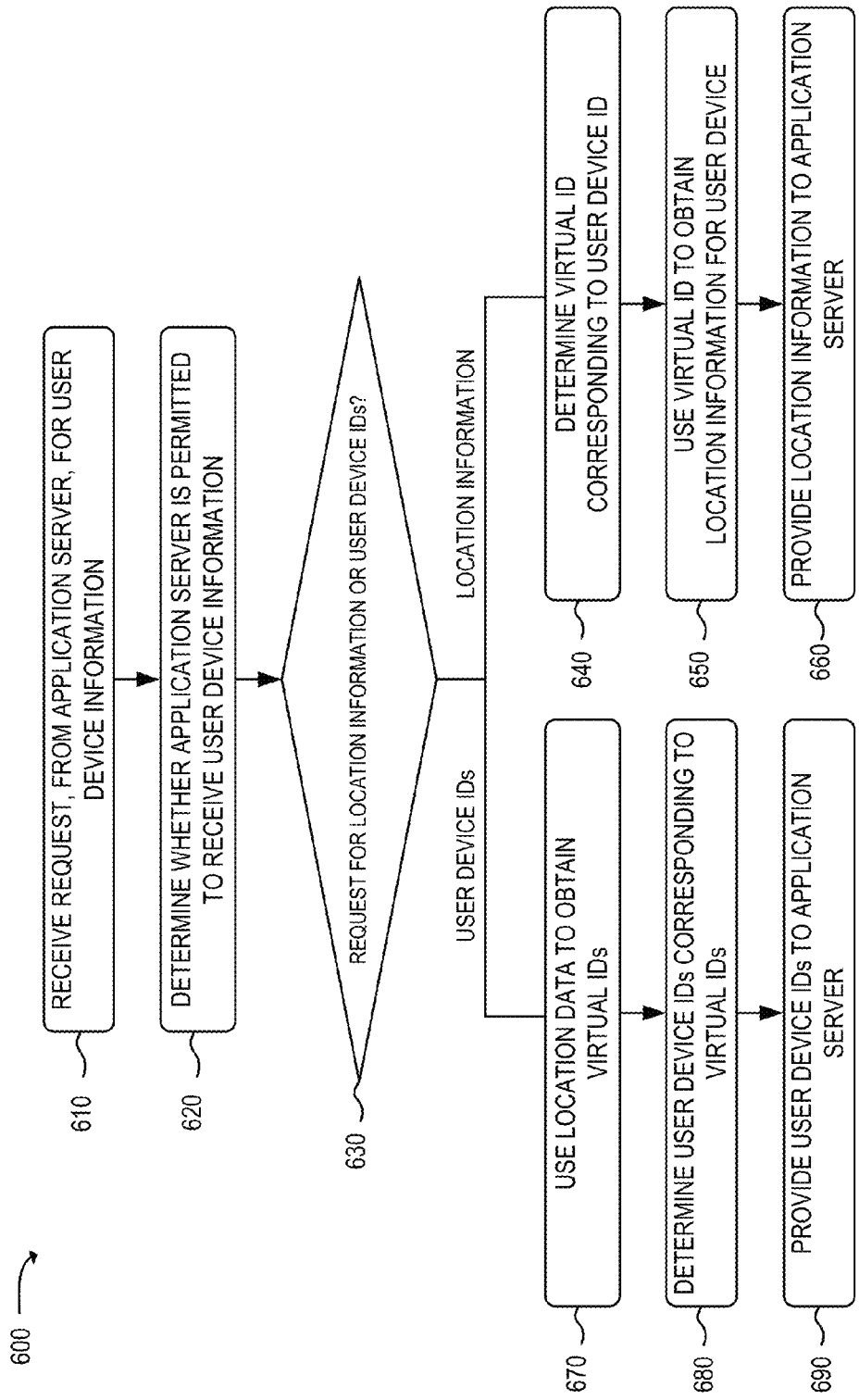

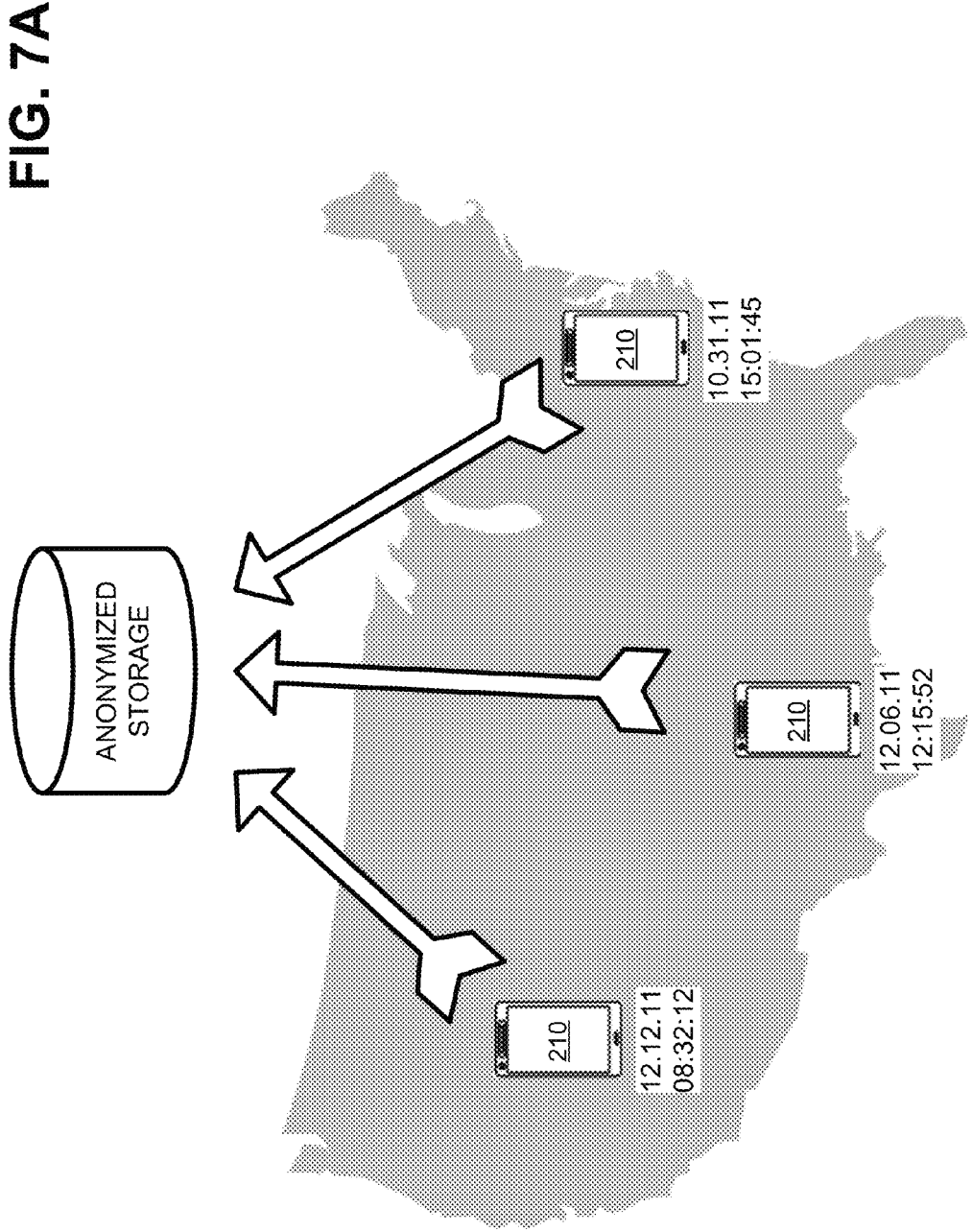

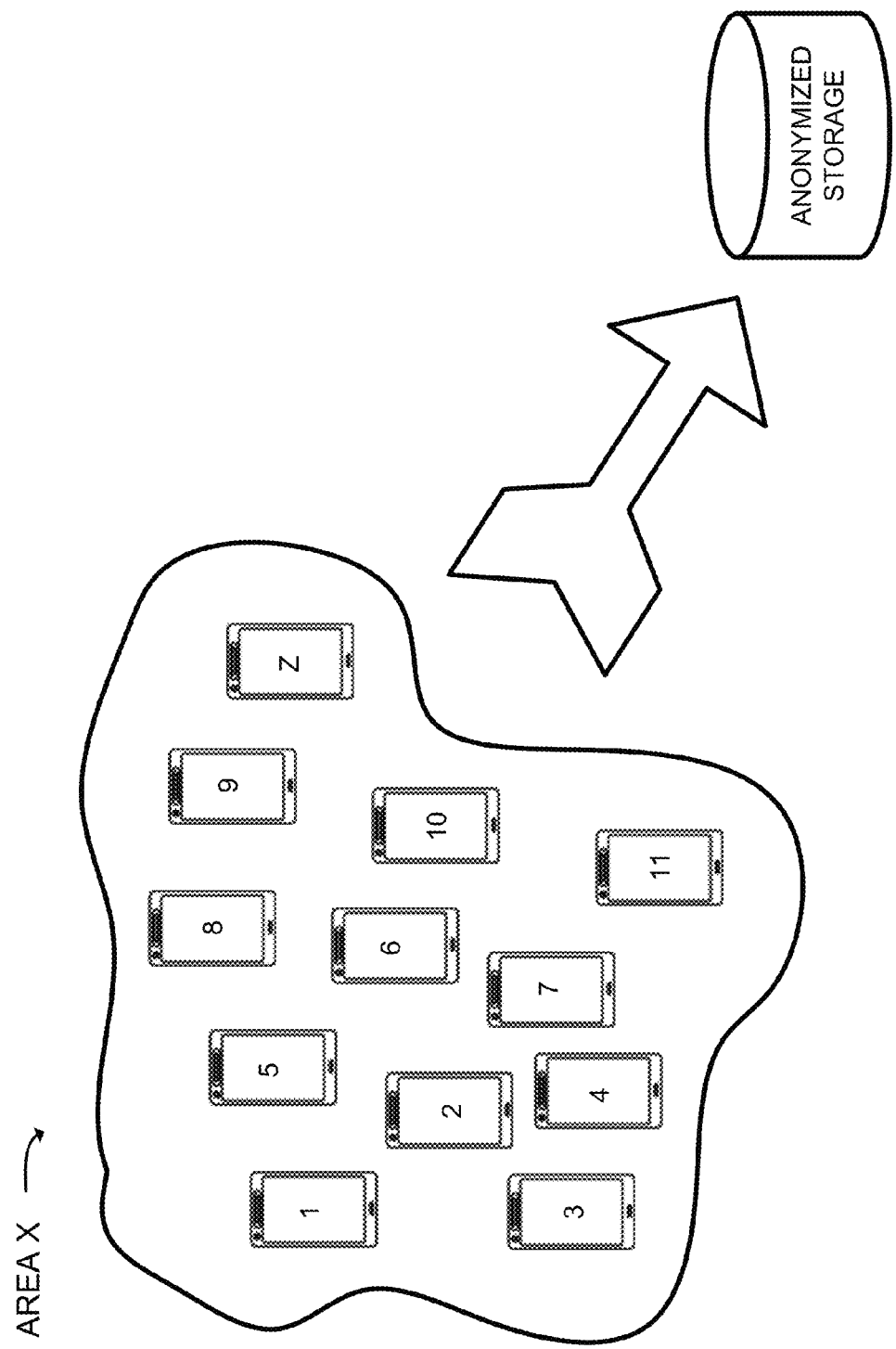

US 8,972,605 B2

SECURE LOCATION IDENTIFICATION SERVICE

BACKGROUND

Services exist for providing real-time road traffic data based on data concerning locations of mobile devices. For example, a traffic data provider can receive anonymous location information for mobile devices communicating via a wireless service provider's network. The traffic data provider can analyze the location information to determine real-time traffic data that can be provided to mobile devices.

BRIEF DESCRIPTION OF THE DRAWINGS

FIGS. 1A and 1B are diagrams of an overview of an example implementation described herein;

FIG. 5B is a diagram of an example data structure that stores information mapping a user identifier with a virtual identifier;

FIG. 6 is a flow chart of an example process for providing user device information to an application server;

FIGS. 7A-7C are diagrams of an example use case for geo-tagging a photograph; and FIGS. 8A-8B are diagrams of an example use case for sending a message to particular user devices in a particular area.

DETAILED DESCRIPTION OF PREFERRED EMBODIMENTS

The following detailed description refers to the accompanying drawings. The same reference numbers in different drawings may identify the same or similar elements.

Systems and/or methods, described herein, may provide location information regarding a particular user device and/or identify user devices located in a particular area using anonymized location data.

Figure 1B:
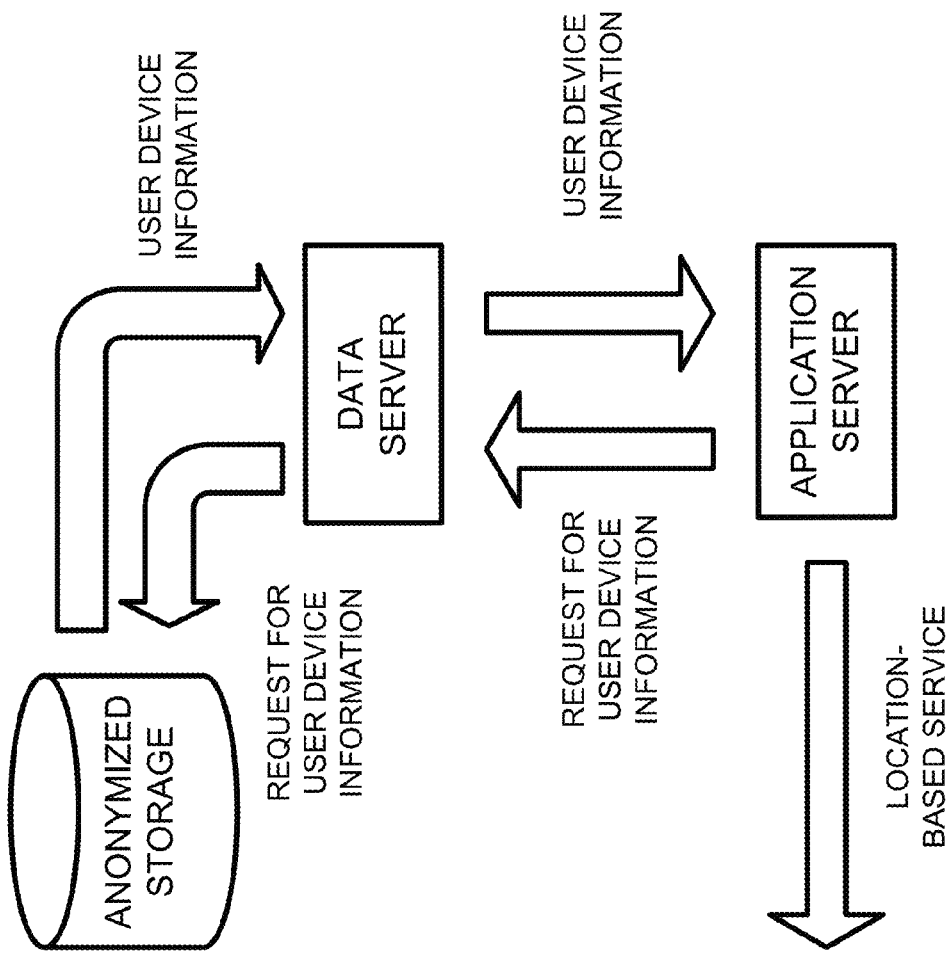

FIGS. 1A and 1B are diagrams of an overview of an example implementation described herein. As shown in FIG. 1A, a switch may receive communication from a user device. The communication data may include, for example, a user device identifier (ID) that uniquely identifies the user device, and location information that identifies a geographic location of the user device. The switch may provide the user device ID and the location information to a data server. The data server may anonymize the data by, for example, mapping the user device ID to a virtual ID. The virtual ID may obscure the identity of the user device. The data server may store the location information along with the virtual ID in anonymized storage. Thus, the location information, stored in the anonymized storage, may not be traceable to the user device ID. Further, the user device ID may be anonymized with respect to the location server and any other device having access to the anonymized storage.

While FIG. 1A shows the data server storing location information for a particular user device, the data server may, in practice, store location information for a group of user devices, such as a group of user devices associated with a particular wireless service provider. Like the location information for the user device, the location information for the group of user devices may be anonymized so that the location information cannot be traced to particular user devices in the group.

As shown in FIG. 1B, an application server may seek user device information regarding one (or more) of its customers so that the application server can provide a location-based service to its customer(s). Assume that the application server seeks to provide a location-based service for the user device. The application server may send a request for user device information to the data server, such as a request for location information regarding a particular user device and/or a request for information regarding user devices located in a particular area (e.g., a particular geographic area).

As an example, assume that the request for user device information includes a request for location information regarding a particular user device. As part of the request, the application server may provide a user device ID to the data server. The data server may map the user device ID to a virtual ID and may use the virtual ID to obtain location information, for the user device, from the anonymized storage. The data server may provide the location information, associated with the virtual ID and thus associated with the user device ID, to the application server as a response to the request.

As another example, assume that the request for user device information includes a request for information to identify user devices located in a particular geographic area. As part of the request, the application server may provide, to the data server, location information regarding a particular area (e.g., longitude and latitude coordinates defining a geographic position, a radius, a geographic area defined by a boundary line, a zip code, an area code, etc.). The data server may use the location information to obtain one (or more) virtual ID(s) from the anonymized storage relating to virtual IDs of user devices in the particular geographic area. In some implementations, the data server may identify the user devices associated with the virtual IDs to identify user devices in the particular area of the location information. In some implementations, the data server may provide the user device IDs of the identified user devices to the application server.

The application server may use the user device information (e.g., location information associated with a particular user device or information identifying user devices in a particular geographic area) to provide a location-based service. For example, the application server may provide a geo-tagging service based on the user device information, may transmit a message (e.g., an emergency message, a coupon, an advertisement, or the like) based on the user device information, may perform marketing based on the location information, or may provide some other location-based service based on the location information.

As described above, the application server may receive location information regarding particular user devices based on anonymized location data. As a result, the location data may continue to be anonymized for a party not authorized to identify user device location information while allowing an authorized party (e.g., a party associated with the application server), to receive user device location information to provide a location-based service to customers associated with user devices.

Figure 2:
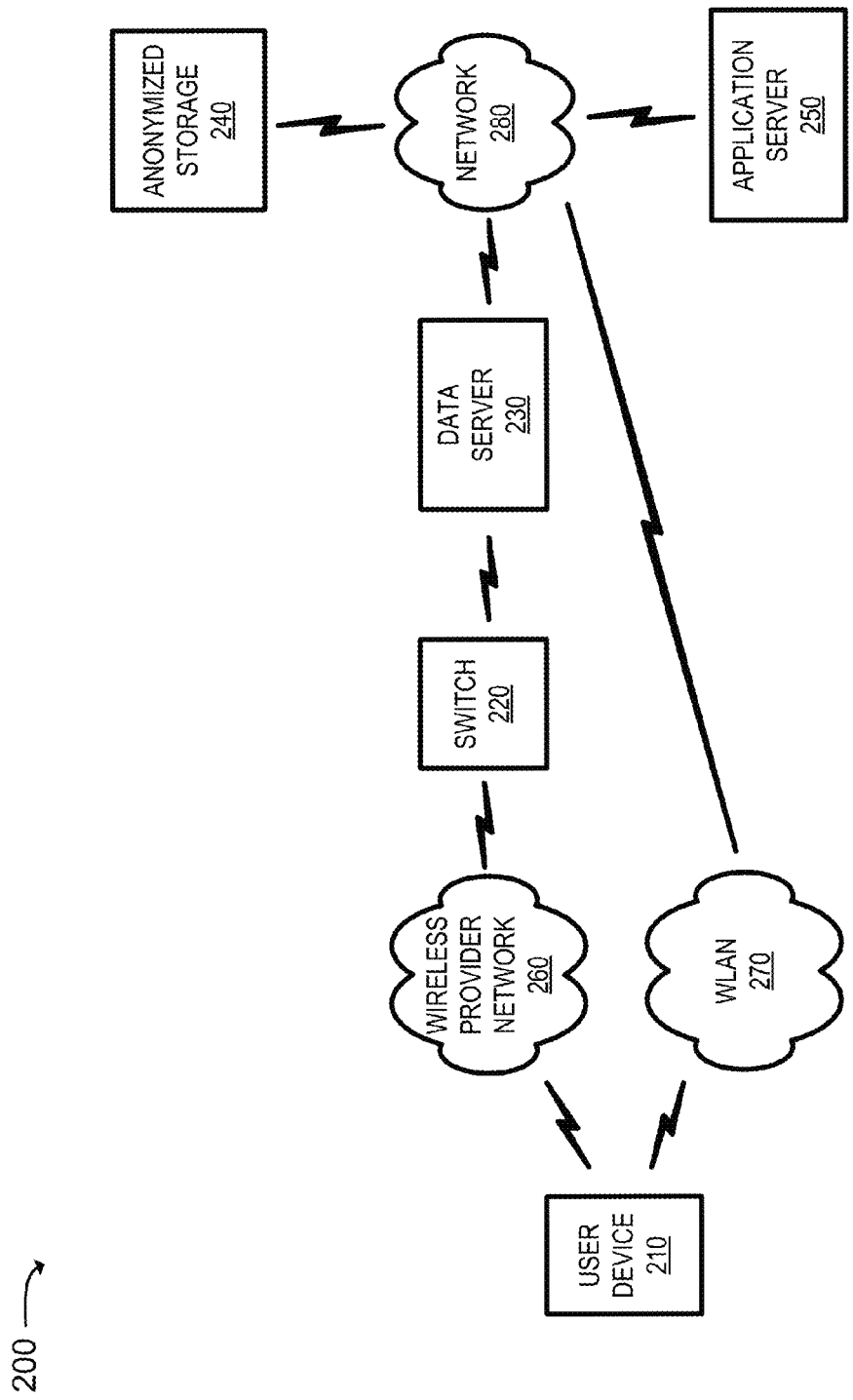
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a switch 220, a data server 230, a anonymized storage 240, an application server 250, a wireless provider network 260, a wireless local area network (WLAN) 270, and a network 280.

User device 210 may include a mobile communication device that is capable of communicating via wireless provider network 260 and/or WLAN 270. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a tablet computer, a personal gaming system, or another type of communication device. The description to follow will generally refer to user device 210 as a wireless mobile communication device. The description is not limited, however, to a wireless mobile communication device and may equally apply to other types of mobile user devices.

Switch 220 may include a network device that gathers, processes, searches, stores, and/or provides information in a manner described herein. For example, switch 220 may include a gateway, a router, a switch, an access point, a hub, a bridge, a proxy server, an optical add-drop multiplexer (OADM), or some other type of device that processes and/or transfers traffic. In one example implementation, switch 220 may include a device that processes communication signals associated with user device 210 and provides information, regarding the processed communication signals, to data server 230. For example, switch 220 may provide user device identifiers, location information, and/or timestamps, associated with the communication signals, to data server 230.

Data server 230 may include a server device or a collection of server devices. In some implementations, data server 230 may receive user device identifiers, location information, and/or timestamps, associated with communication signals of user device 210. As described above, data server 230 may anonymize location information, associated with a user device ID, by associating the user device ID with a virtual ID. In some implementations, data server 230 may provide anonymized location information to an anonymized storage, such as a storage associated with anonymized storage 240. In some implementations, data server 230 may provide user device information to application server 250 based on receiving a request for user device information from application server 250 and based on authorizing application server 250 to receive user device information (e.g., based on privacy information received by user device 210 relating to whether user device 210 permits user device information to be received by application server 250).

Anonymized storage 240 may include a server device or a collection of server devices. In some implementations, anonymized storage 240 may receive and store anonymized location information from data server 230. As described above, information stored by anonymized storage 240 may be used to identify user device information, such as location information for user device 210 and/or information to identify multiple user devices 210 in a particular area.

Application server 250 may include a server device or a collection of server devices. In some implementations, application server 250 may request user device location information from data server 230. As described above, user device location information may relate to location information associated with a particular user device 210 or with information to identify user devices 210 in a particular geographic area. In some implementations, application server 250 may provide a user device ID to data server 230 (e.g., as part of a request for location information associated with the user device 210 associated with the user device ID). Additionally, or alternatively, application server 250 may provide information (e.g., to data server 230) to identify user devices 210 in a particular area (e.g., as part of a request for information to identify user devices 210 in the particular area of the location information).

Wireless provider network 260 may include one or more wired and/or wireless networks via which user devices 210 communicate and/or receive content. For example, wireless provider network 260 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, wireless provider network 260 may include a wide area network (WAN), a metropolitan area network (MAN), an ad hoc network, an intranet, a fiber optic-based network, and/or a combination of these or other types of networks.

WLAN 270 may include a local wireless network, such as a wireless fidelity (WiFi) network, a wireless distribution system, a wireless peer-to-peer network, or the like. As shown in FIG. 2, WLAN 270 may permit user device 210 to connect to network 280 without connecting via wireless provider network 260. In some implementations, WLAN 270 may be part of network 280.

Network 280 may include one or more wired and/or wireless networks. For example, network 280 may include a cellular network, the PLMN, a 2G network, a 3G network, a 4G network (e.g., a LTE network), a 5G network, and/or another network. Additionally, or alternatively, network 280 may include a WAN, a MAN, a telephone network (e.g., the Public Switched Telephone Network (PSTN)), an ad hoc network, an intranet, the Internet, a fiber optic-based network, and/or a combination of these or other types of networks.

The quantity of systems, devices, and/or networks, illustrated in FIG. 2, is provided for explanatory purposes only. In practice, there may be additional systems, devices and/or networks; fewer systems, devices, and/or networks; different systems, devices, and/or networks; or differently arranged systems, devices, and/or networks than illustrated in FIG. 2. Also, in some implementations, one or more of the devices of environment 200 may perform one or more functions described as being performed by another one or more of the devices of environment 200. Systems, devices, and/or networks of environment 200 may interconnect via wired connections, wireless connections, or a combination of wired and wireless connections. Also, while switch 220 and data server 230 are shown as being located external to wireless provider network 260, in practice, switch 220 and data server 230 may be part of wireless provider network 260.

Figure 3:
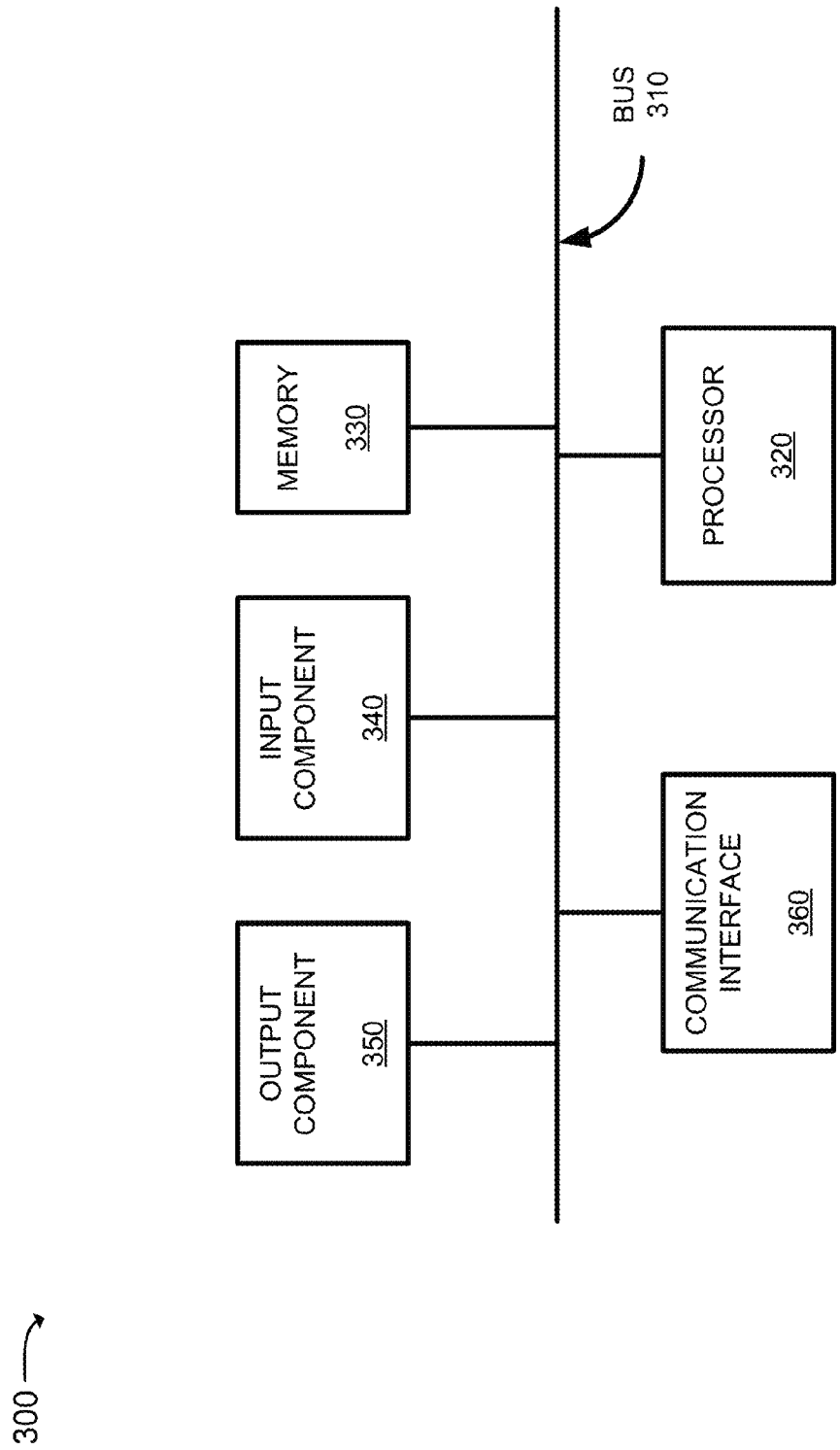
FIG. 3 is a diagram of example components of a device that may correspond to one or more of the devices in the environment of FIG. 2.

FIG. 3 is a diagram of example components of a device 300 that may correspond to user device 210, switch 220, data server 230, anonymized storage 240, and/or application server 250. Alternatively, each of user device 210, switch 220, data server 230, anonymized storage 240, and/or application server 250 may include one or more devices 300 and/or one or more components of device 300.

Device 300 may include a bus 310, a processor 320, a memory 330, an input component 340, an output component 350, and a communication interface 360.

Bus 310 may include a path that permits communication among the components of device 300. Processor 320 may include one or more processors, microprocessors, or processing logic (e.g., application specific integrated circuits (ASICs), field programmable gate arrays (FPGAs), etc.) that interprets and executes instructions. Memory 330 may include any type of dynamic storage device (e.g., random access memory (RAM)) that stores information and instructions for execution by processor 320, any type of non-volatile storage device (e.g., read only memory (ROM)) that stores information for use by processor 320, and/or any other type of storage device, such as a flash memory.

Input component 340 may include a component that permits a user to input information to device 300, such as a keyboard, a keypad, a button, a switch, etc. Output component 350 may include a component that outputs information to the user, such as a display, a speaker, a light emitting diodes (LED), etc.

Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include components for communicating with another device or system via a network, such as wireless provider network 260, WLAN 270, and/or network 280. In one implementation, communication interface 360 may be a logical component that includes input and output ports, input and output systems, and/or other input and output components that facilitate the transmission of data to other devices.

Device 300 may perform certain operations described herein. Device 300 may perform these operations in response to processor 320 executing software instructions contained in a computer-readable medium, such as memory 330. A computer-readable medium may be defined as a non-transitory memory device. A memory device may include memory space within a single physical storage device or memory space spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Figure 4:
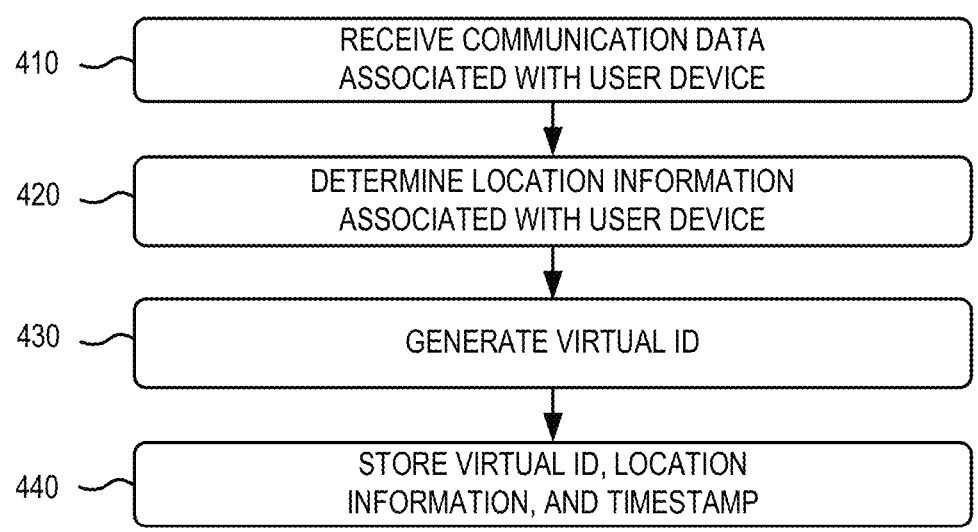
FIG. 4 is a flow chart of an example process for storing anonymized location information.

FIG. 4 illustrates a flowchart of an example process 400 for storing anonymized location information. In one implementation, process 400 may be performed by one or more components of data server 230. In another implementation, some or all of blocks of process 400 may be performed by one or more components of another device in environment 200 (e.g., anonymized storage 240 or application server 250), or a group of devices including or excluding data server 230.

As shown in FIG. 4, process 400 may include receiving communication data associated with user device (block 410). For example, data server 230 may receive communication data associated with user device 210 from switch 220 when switch 220 processes communication signals associated with user device 210 and provides information, regarding the processed communication signals, to data server 230.

Process 400 may also include determining location information associated with the user device (block 420). For example, data server 230 may determine location information associated with the user device based on receiving the communication data from switch 220. In some implementations, the communication data may include a user device ID associated with user device 210. Additionally, the communication data may include the location information (e.g., based on information provided by a global positioning system (GPS) of user device 210 and/or based on location information associated with particular device(s) in wireless service provider network 260 with which user device 210 connects) and may also include a timestamp associated with the location information.

Process 400 may further include generating a virtual ID (block 430). For example, data server 230 may generate a virtual ID associated with the user device ID based on information associated with the user device ID or a user of user device 210. For example, the virtual ID may generated based on a user ID, such as a username, a password, an email address, a personal identification number (PIN), or the like. In some implementations, the virtual ID may correspond to information associated with the user device ID, such as a mobile equipment identifier (MEID), an international mobile equipment identifier (IMEI), a mobile directory number (MDN), an international mobile subscriber identity (IMSI), an electronic serial number (ESN), a universal integrated circuit card (UICC) identifier, a mobile identification number (MIN), a mobile subscriber integrated services digital network (MSISDN) number, a national access identifier (NAI), or the like. In some implementations, the virtual ID may correspond to a combination of a user ID and a user device ID. As described above, the virtual ID may be used to anonymize the user device ID such that anonymized storage 240 may store anonymized location data.

Process 400 may also include storing the virtual ID, location information, and timestamp (block 440). For example, data server 230 may store the virtual identifier, location information, and timestamp in a storage of data server 230. In some implementations, data server 230 may store the virtual ID, location information, and timestamp in a format that may be provided for storage to another device in environment 200, such as anonymized storage 240. For example, data server 230 may provide the virtual ID, location information, and timestamp to anonymized storage 240 via network 280.

While a particular series of blocks has been described above with regard to FIG. 4, the blocks and/or the order of the blocks may be modified in other implementations. Further, non-dependent blocks may be performed in parallel. Additionally, blocks 410-440 may be repeated for multiple user devices 210. For example, data server 230 may receive communication data associated with multiple user devices 210 (block 410), determine location information associated with each user device 210 (block 420), generate virtual IDs for each user device 210 (block 430), and may store virtual IDs, location information, and timestamps for each communication for each user device 210 (block 440).

Figure 5A:
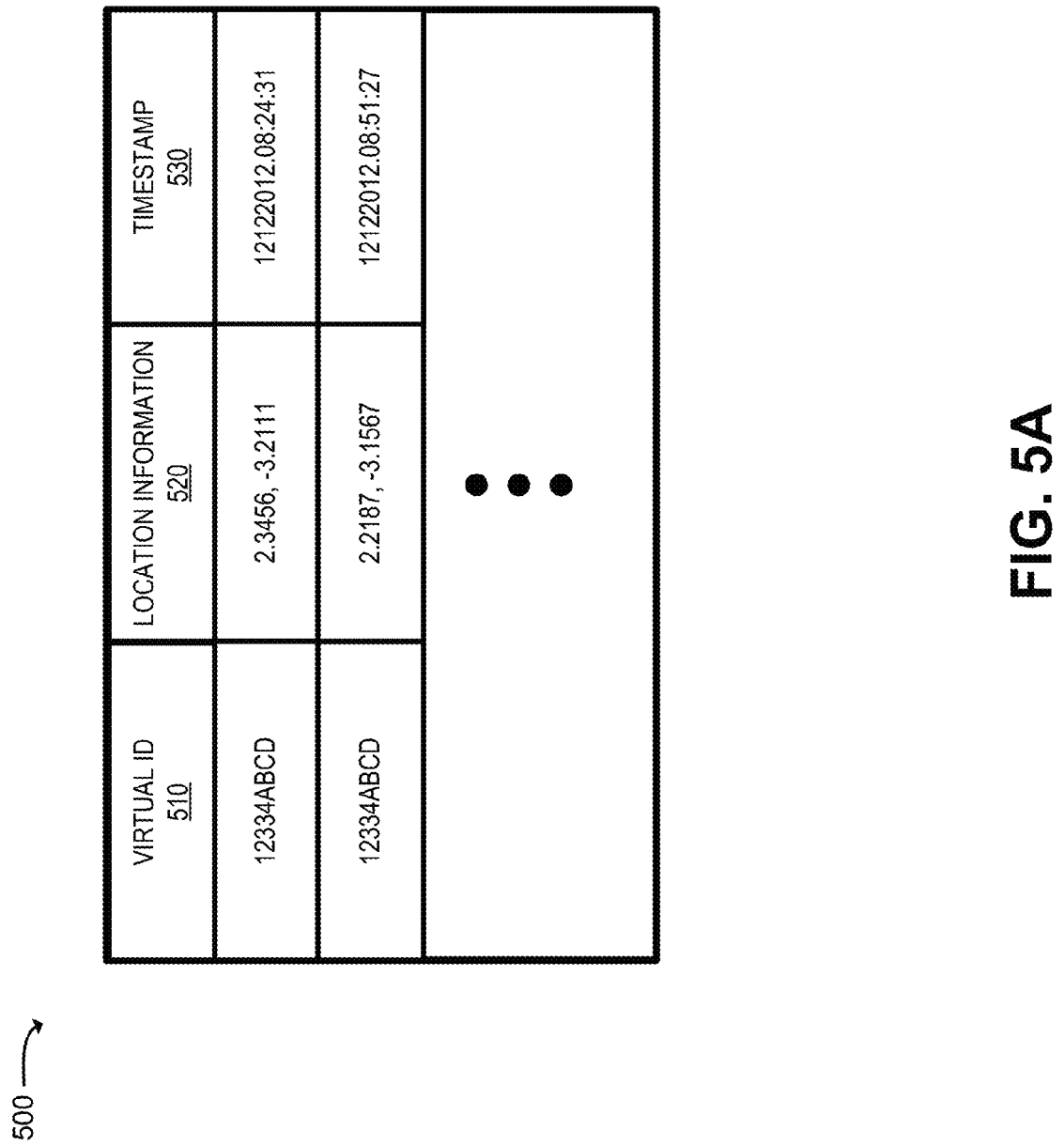
FIG. 5A is a diagram of an example data structure that stores anonymized location information.

FIG. 5A illustrates an example data structure 500 that may be stored by one or more devices in environment 200, such as data server 230 or anonymized storage 240. In one implementation, data structure 500 may be stored in a memory of data server 230 or anonymized storage 240. In another implementation, data structure 500 may be stored in a memory separate from, but accessible by data server 230 or anonymized storage 240. In some implementations, data structure 500 may be stored by some other device in environment 200, such as application server 250.

A particular instance of data structure 500 may contain different information and/or fields than another instance of data structure 500. In some implementations, data structure 500 may correspond to information associated with location information for user devices 210 associated with virtual IDs. One instance of data structure 500 may store information regarding one set of user devices 210 in environment 200, whereas another instance of data structure 500 may store information another set of user devices 210. As shown in FIG. 5A, data structure 500 may include virtual ID field 510, location information field 520, and timestamp field 530.

Virtual ID field 510 may store a virtual ID associated with user device 210. For example, as described above, data server 230 may map a user device ID to a virtual ID to anonymize the user ID such that a user device 210, associated with the user ID, may not be identified by information stored by data structure 500. In some implementations, information stored by virtual ID field 510 may be based on the mapping of a user device ID with a corresponding virtual ID by data server 230. Virtual ID field 510 may store a virtual ID in the form of a string of characters in any format. While a particular format and length of character string stored by virtual ID field 510 is shown in FIG. 5A, in practice, a character string in any format and any length may be stored by virtual ID field 510.

Location information field 520 may store location information corresponding to a particular user device 210 associated with the virtual ID stored by virtual ID field 510. In some implementations, information stored by location information field 520 may correspond to information provided by data server 230 relating to location information associated with the particular user device 210 associated with the virtual ID stored by virtual ID field 510. As shown in FIG. 5A, location information field 520 may store location information in the form of longitude and latitude coordinates. Additionally, or alternatively, location information field 520 may store location information in some other form (e.g., a city, a state, a country, a particular area, etc.). As an example, assume that that the user device 210 associated with the virtual ID of 12334ABCD was at the location associated with longitude and latitude coordinates 2.3456,−3.2111. Location information field 520 may store information, such as 2.3456,−3.2111 to identify longitude and latitude coordinates associated with the location of the user device 210 associated with the virtual ID of 12334ABCD.

Timestamp field 530 may store information relating to a time at which data server 230 receives information (e.g., from switch 220) regarding location information of user device 210, associated with the virtual ID of virtual ID field 510. In some implementations, information stored by timestamp field 530 may be in a format to identify a month, a date, a year, and a time. As an example, assume that the user device 210 associated with the virtual ID of 12334ABCD was at the location associated with longitude and latitude coordinates 2.3456,−3.2111 on Dec. 12, 2012 at 08:24:31. Timestamp field 530 may store a timestamp, such as 12122012.08:24:31 to correspond to a time in which the user device 210 associated with the virtual ID of 12334ABCD was at the location associated with longitude and latitude coordinates 2.3456,−3.2111.

While particular fields are shown in a particular format in data structure 500, in practice, data structure 500 may include additional fields, fewer fields, different fields, or differently arranged fields than are shown in FIG. 5A.

FIG. 5B illustrates an example data structure 550 that may be stored by one or more devices in environment 200, such as data server 230. In one implementation, data structure 550 may be stored in a memory of data server 230. In another implementation, data structure 550 may be stored in a memory separate from, but accessible, by data server 230. In some implementations, data structure 500 may be stored by some other device in environment 200.

A particular instance of data structure 550 may contain different information and/or fields than another instance of data structure 550. In some implementations, data structure 550 may correspond to information that maps user device IDs with virtual IDs. One instance of data structure 550 may store information regarding one set of user devices 210, whereas another instance of data structure 550 may store information another set of user devices 210. As shown in FIG. 5A, data structure 550 may include virtual ID field 560 and user device ID field 570.

Virtual ID field 560 may store information regarding a virtual ID for a corresponding user device ID when data server 230 generates a virtual ID for user device 210, as described above with respect to process 400. Like virtual ID field 510, virtual ID field 560 may store a virtual ID in the form of a string of characters in any format. In some implementations, virtual ID field 560 may map to a user device ID such that the user device ID may not be received by anonymized storage 240 (e.g., when data server 230 provides anonymized storage 240 with location information associated with user device 210). In an example shown in FIG. 5B, virtual ID field 560 may store the character string 12334ABCD. While a particular format and length of character string stored by virtual ID field 560 is shown in FIG. 5B, in practice, a character string in any format and any length may be stored by virtual ID field 560.

User device ID field 570 may store information regarding a user device ID associated with a particular user device 210 and mapped to a virtual ID stored by virtual ID field 560. In some implementations, user device ID field 570 may store a user device ID relating to an international mobile equipment identifier (IMEI), a telephone number, or some other identifier relating to user device 210. In an example shown in FIG. 5B, user device ID field 570 may store a user device ID of 490154203237515 mapped to the virtual ID of 12334ABCD. While a particular format and length of character string stored by user ID field 570 is shown in FIG. 5B, in practice, a character string in any format and any length may be stored by user ID field 570.

While particular fields are shown in a particular format in data structure 550, in practice, data structure 550 may include additional fields, fewer fields, different fields, or differently arranged fields than are shown in FIG. 5B.

FIG. 6 illustrates a flowchart of an example process 600 for providing user device information to an application server. In one implementation, process 600 may be performed by one or more components of data server 230. In another implementation, some or all of blocks of process 600 may be performed by one or more components of another device in environment 200 (e.g., anonymized storage 240 or application server 250), or a group of devices including or excluding data server 230.

As shown in FIG. 6, process 600 may include receiving a request, from an application server, for user device information (block 610). For example, data server 230 may receive a request, from application server 250, for user device information associated with user device 210. In some implementations, the request may include a request for location information for a particular user device 210 and may also include a user device ID associated with user device 210. Alternatively, the request may include a request for information to identify user devices 210 in a particular area (e.g., a request for user device identifiers relating to user devices 210 in the particular area) and may include location data to identify the particular area (e.g., longitude and latitude coordinates, a border of an area, such as state, city, county, or country border, etc.). In some implementations, the request may include information regarding a timestamp (e.g., to request user device information based on a particular time corresponding to the timestamp).

Process 600 may also include determining whether application server 250 is permitted to receive user device information (block 620). For example, data server 230 may determine whether application server 250 is permitted to receive user device information based on privacy information provided by user device 210 relating to whether application server 250 is permitted to receive user device information associated with user device 210. In some implementations, data server 230 may authenticate application server 250 to determine that the request for user device information originated from application server 250.

Process 600 may further include determining whether the request is for location information or for user device identifiers (block 630). For example, data server 230 may determine whether the request is for location information or for user device identifiers based on information included in the request as described above with respect to block 610.

If the request is for location information associated with a particular user device 210 (block 630—LOCATION INFORMATION), process 600 may include determining a virtual ID corresponding to user device ID (block 640). For example, data server 230 may determine a virtual ID corresponding to the user device ID included in the request based on information stored by data structure 550. In some implementations, data server 230 may generate the virtual ID and store the mapping of the virtual ID to a corresponding user ID in data structure 550.

Process 600 may also include using the virtual ID to obtain location information for the user device (block 650). For example, data server 230 may request location information associated with the virtual ID and/or a timestamp, associated with the request, from anonymized storage 240. In some implementations, anonymized storage 240 may identify location information by virtual ID based on information stored by data structure 500. For example, anonymized storage 240 may perform a memory look-up function to identify location information associated with the virtual ID provided by data server 230 and provide the identified location information to data server 230. In some implementations, anonymized storage 240 may perform a memory look-up function to identify location information associated with the virtual ID and the timestamp to identify location information associated with the virtual ID and the timestamp.

Process 600 further include providing the location information to the application server (block 660). For example, data server 230 may provide the location information to application server 250 based on obtaining the location information for user device 210 as described above with respect to block 650. In some implementations, application server 250 may provide a location-based service (e.g., a geo-tagging service, or some other location-based service) to user device 210 when application server 250 receives the location information from data server 230.

If, on the other hand, the request includes a request for user device IDs (block 630—USER DEVICE IDs), process 600 may include using the location information to obtain virtual IDs (block 670). For example, data server 230 may use the location information provided by application server 250 (e.g., as part of the request provided by application server 250 as described above), to request information regarding virtual IDs from anonymized storage 240 relating to virtual IDs of user devices 210 located in the area identified by the location data at a time corresponding to the timestamp which may be provided as part of the request from application server 250. For example, anonymized storage 240 may provide, to data server 230, virtual IDs based on the timestamp and based on the location data. In some implementations, anonymized storage 240 may identify the virtual IDs based on information stored by data structure 500. For example, anonymized storage 240 may perform a memory look-up function to identify virtual IDs located in the area identified by the location data at a time corresponding to the timestamp.

Process 600 may further include determining user device IDs corresponding to the virtual IDs (block 680). For example, data server 230 may determine the user device IDs corresponding to the virtual IDs provided by anonymized storage 240 based on information stored by data structure 550.

Process 600 may also include providing the user device IDs to the application server (block 690). For example, data server 230 may provide the user device IDs to application server 250 based on identifying the user device IDs as described above.

In some implementations, application server 250 may use the user device IDs to provide a location-based service to respective customers of user devices 210 associated with the user device IDs. For example, application server 250 may provide a message (e.g., a public message, an emergency alert message, a merchant related promotion message, or some other message) to user devices 210 associated with the user device IDs.

While a particular series of blocks has been described above with regards to FIG. 6, the blocks and/or the order of the blocks may be modified in other implementations. Further, non-dependent blocks may be performed in parallel.

Figure 7B:
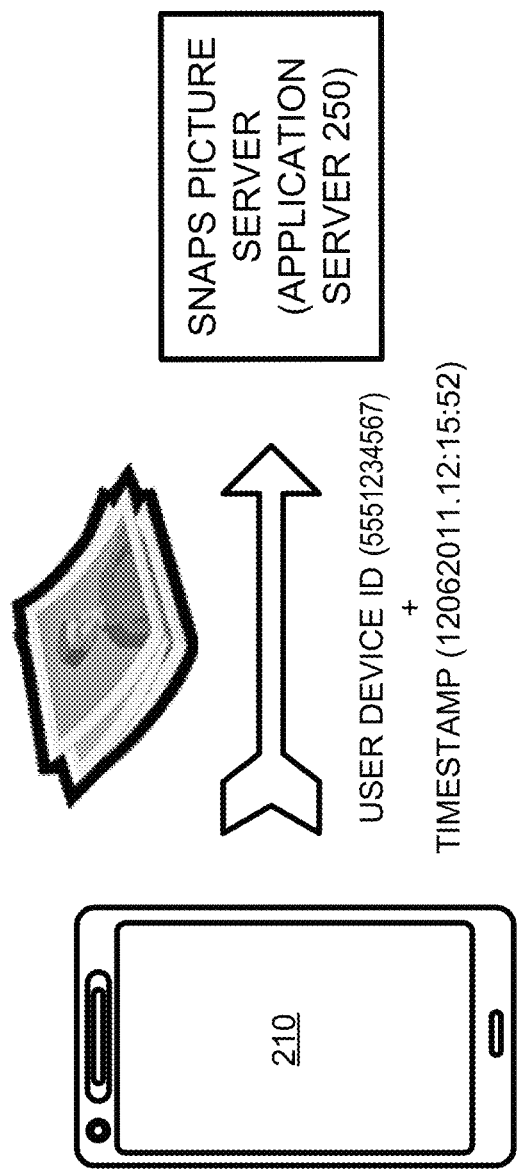
Figure 7C:
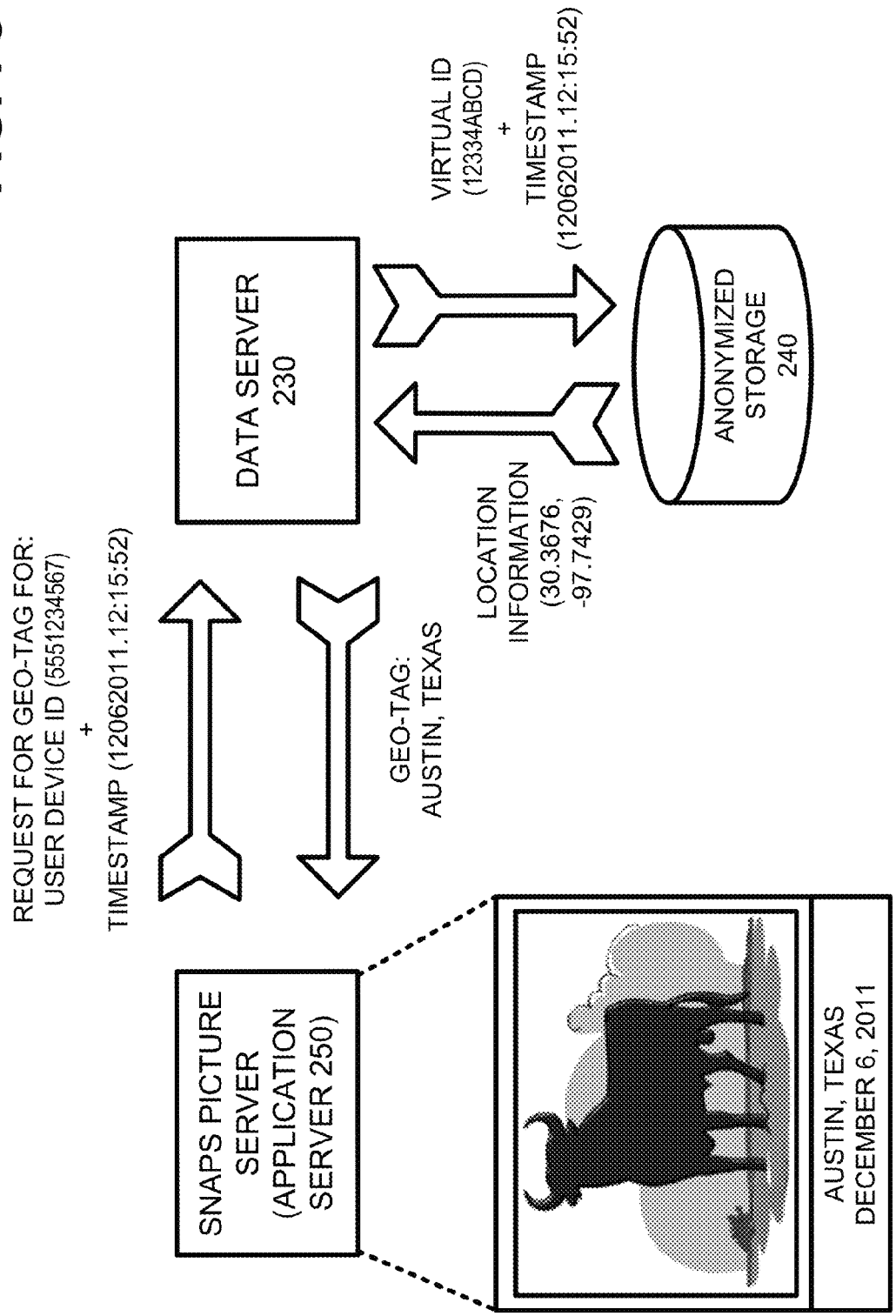

FIGS. 7A-7C are diagrams of an example use case for geo-tagging a photograph. In FIG. 7A, assume that user device 210 provides location information to an anonymized storage. For example, as described above, user device 210 may provide location information to the anonymized storage (e.g., a storage associated with data server 230 or anonymized storage 240), via switch 220 and data server 230, as described above. For example, data structure 230 may anonymize user device 210 by generating a virtual ID associated with a user device ID of user device 210.

Further assume, with respect to FIG. 7B, that user device 210 provides data relating to a photograph to a particular application server 250, such as the application server "Snaps Picture Server." Further assume that user device 210 has the user device ID of "5551234567" and that user device 210 provides the data relating to the photograph at a time corresponding to a timestamp of (12062011.12:15:52).

As shown in FIG. 7C, application server 250 (i.e., "Snaps Picture Server") may request user device information from data server 230 so that application server 250 can add a geo-tag to the photograph. In some implementations, the request may include the user device ID of user device 210 and the timestamp. As described above with respect to process 600, data server 230 may receive the user device ID and the timestamp, and may determine a virtual ID corresponding to the user device ID based on information stored by data structure 550. As further shown in FIG. 7C, data server 230 may request location information associated with the virtual ID and the timestamp from anonymized storage (e.g., a storage associated with data server 230 or anonymized storage 240). In some implementations, and as shown in FIG. 7C, the anonymized storage may provide the location information (e.g., in the form of longitude and latitude coordinates, a city and state name, or some other form) to data server 230 as a response to the request for the location information.

As further shown in FIG. 7C, data server 230 may provide the location information to application server 250 (i.e., "Snaps Picture Server"). In some implementations, application server 250 may apply the location information to the data relating to the photograph received by user device 210. As a result, application server 250 may provide for geo-tagging photo services based on receiving user device location information from data server 230 and from the anonymized storage.

While a particular example implementation of applying user device location information is described above with respect to FIGS. 7A-7C, in practice, user device location information may be used for some other purpose not described in FIGS. 7A-7C. For example, application server 250 may be associated with a merchant subscribed with user device 210 to provide user device 210 with merchant-related information associated with user device location information (e.g., promotions, advertisements, etc. related to the user device location information of user device 210).

Figure 8B:
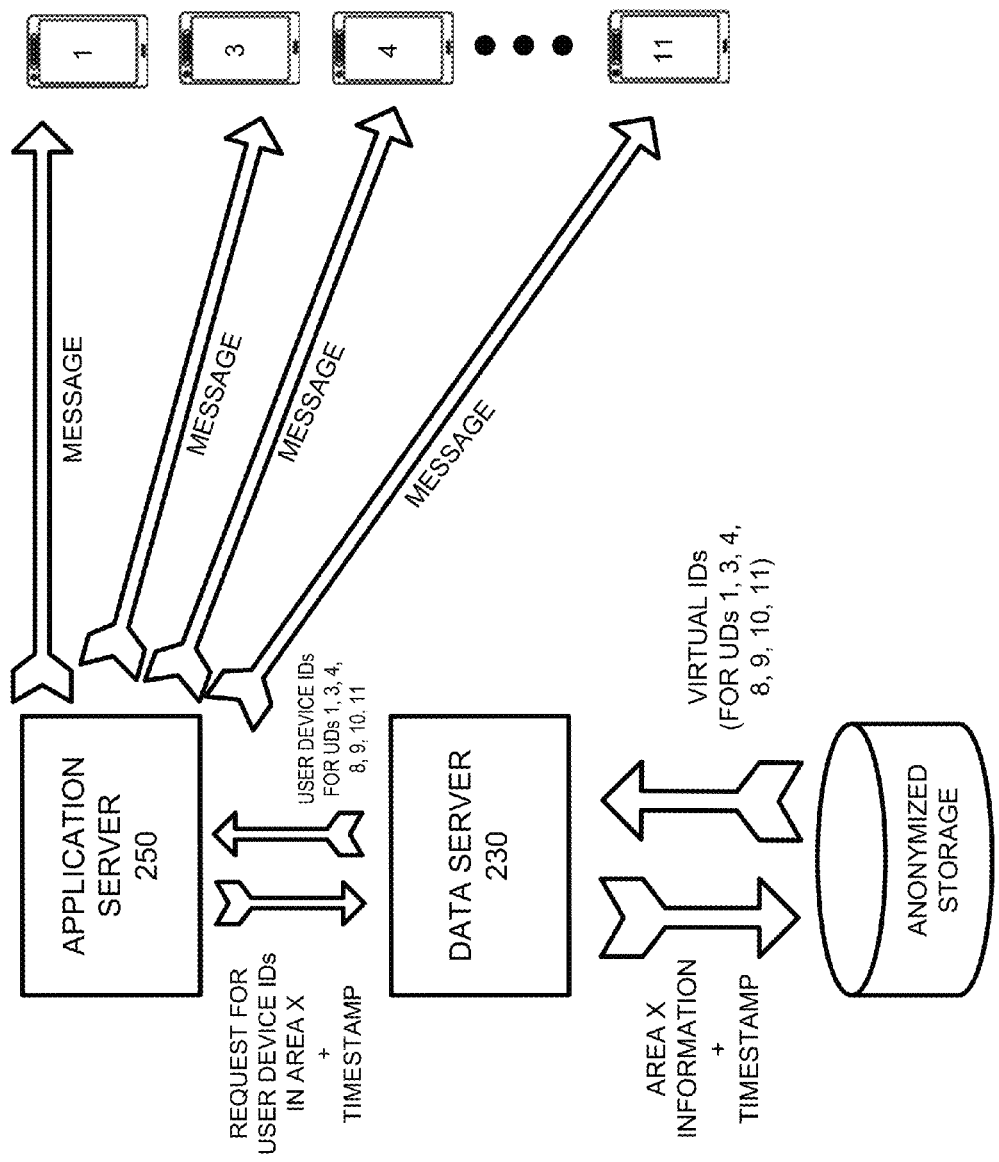

FIGS. 8A-8B are diagrams of an example use case for sending a message to particular user devices in a particular area. In FIG. 8A, assume that multiple user devices 210 (shown as 1, 2, 3 . . . Z) in a particular area (e.g., "area X") provide location information to an anonymized storage. For example, as described above, each user device 210 may provide location information to the anonymized storage (e.g., a storage associated with data server 230 or anonymized storage 240), via switch 220 and data server 230. As described above, data server 230 may anonymize user device 210 by generating a virtual ID associated with a user device ID of user device 210.

As shown in FIG. 8B, application server 250 may send a request, to data server 230, to identify user device IDs associated with user devices 210 located in area X. In some implementations, the request may include location information to identify area X and may also include a timestamp. As shown in FIG. 8B, data server 230 may provide the information regarding area X and information regarding the timestamp to the anonymized storage as a request for virtual IDs corresponding to user devices 210 located in area X during the time corresponding to the timestamp. In FIG. 8B, assume that that the anonymized storage identifies virtual IDs corresponding to user devices 1, 2, 3 . . . Z relating to the user devices 210 that are located in area X during the time corresponding to the timestamp (e.g., as shown in FIG. 8A). In some implementations, data server 230 may identify that application server 250 may be authorized to receive location information only for user devices 1, 3, 4, 8, 9, 10, and 11. For example, user devices 2, 5, 6, 7, and Z may store permissions information to prevent application server 250 from receiving location information or may not be associated with application server 250 (e.g., may not be customers of application server 250). The anonymized storage may provide the virtual IDs to data server 230 and data server 230 may identify the user device IDs corresponding to the virtual IDs (e.g., based on information stored by data structure 550).

As further shown in FIG. 8B, data server 230 may provide information regarding the user device IDs to application server 250. In some implementations, application server 250 may provide a message to the user devices 210 associated with the user device IDs, such as a message relating to a to public service announcement, a weather alert, an emergency alert, a merchant promotion, etc. based on identifying a user device located in area X at the time corresponding to the timestamp.

While a particular example is described above with respect to FIG. 8A-8B, in practice, user device information relating to user devices 210 in a particular area may be used for some other purpose not described above and is not limited to what is described.

As described above, application server 250 may receive location information regarding particular user devices 210 based on anonymized location data. As a result, the location data may continue to be anonymized for a party not authorized to identify user device location information while allowing an authorized party (e.g., a party associated with application server 250), to receive user device location information to provide a location-based service to customers associated with user devices 210.

The foregoing description provides illustration and description, but is not intended to be exhaustive or to limit the implementations to the precise form disclosed. Modifications and variations are possible in light of the above implementations or may be acquired from practice of the embodiments.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and/or methods were described without reference to the specific software code—it being understood that software and control hardware can be designed to implement the systems and/or methods based on the description herein.

Further, certain portions, described above, may be implemented as a component that performs one or more functions. A component, as used herein, may include hardware, such as a processor, an ASIC, or an FPGA, or a combination of hardware and software (e.g., a processor executing software).

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a first server and from a second server, a request for user device information,
   the request for the user device information including a first identifier associated with a first user device,
   the first user device being associated with a second identifier to anonymize the first identifier from a third server that stores particular information associated with the first user device, and
the particular information including:
first location information associated with the second identifier and a first timestamp, and
second location information associated with the second identifier and a second timestamp;
determining, by the first server, the second identifier associated with the first user device based on information, stored by the first server, mapping the second identifier to the first identifier;
providing, by the first server and to the third server, the second identifier to request the first location information associated with the second identifier from the third server;
receiving, by the first server and from the third server, the first location information associated with the second identifier based on providing the second identifier to the third server; and
providing, by the first server and to the second server, the first location information associated with the first user device based on receiving the first location information from the third server,
the second server being capable of providing a first location-based service to the first user device based on receiving the first location information from the first server.

2. The method of claim 1, further comprising:
receiving communication data associated with the first user device;
determining the first location information associated with the first user device based on receiving the communication data;
generating the second identifier associated with the first identifier and the first user device; and
providing the first location information and the second identifier to the third server to allow the third server to store the first location information associated with the second identifier without allowing the third server to identify the first identifier,
where determining the second identifier associated with the first user device is based on generating the second identifier associated with the first user device.

3. The method of claim 1, where the request for the user device information includes the first timestamp and a request for the first location information associated with the first user device at a time associated with the first timestamp.

4. The method of claim 1, further comprising:
receiving a particular request from a fourth server,
the particular request including:
a request for information to identify one or more second user devices located in a particular geographic area, and
information to identify the particular geographic area, and
a particular second user device, of the one or more second user devices, being associated with a third identifier and a fourth identifier to anonymize the third identifier from the third server;
providing the information to identify the particular geographic area to the third server as a request for the fourth identifier associated with the particular second user device located in the particular geographic area;
receiving, from the third server, the fourth identifier based on providing the information to identify the particular geographic area;
determining the third identifier corresponding to the fourth identifier based on information stored by the first server mapping the fourth identifier to the third identifier; and
providing the third identifier to the fourth server,
the fourth server being capable of providing a second location-based service to the one or more second user devices based on the third identifier.

5. A system comprising:
a first server to:
receive, from a second server, a request that includes a first identifier associated with the first user device,
the first user device being associated with a second identifier to anonymize the first identifier from a third server that stores particular information associated with the first user device, and
the particular information including:
first location information associated with the second identifier and a first timestamp, and
second location information associated with the second identifier and a second timestamp;
determine that the second server is permitted to receive the first location information based on permissions information stored by the first user device;
determine the second identifier associated with the first user device based on information stored by the first server mapping the second identifier to the first identifier when the second server is permitted to receive the first location information;
provide, to a third server, the second identifier to request the first location information associated with the second identifier from the third server;
receive, from the third server, the first location information associated with the second identifier based on providing the second identifier to the third server; and
provide, to the second server, the first location information associated with the first user device based on receiving the first location information from the third server,
the second server being capable of providing a first location-based service to the first user device based on receiving the first location information from the first server.

6. The system of claim 5,
where the first server is further to:
receive communication data associated with the first user device;
determine the first location information associated with the first user device based on receiving the communication data;
generate the second identifier associated with the first identifier and the first user device; and
provide the first location information and the second identifier to the third server to allow the third server to store the first location information associated with the second identifier without allowing the third server to identify the first identifier, and
where, when determining the second identifier associated with the first user device, the first server is to:
determine the second identifier based on generating the second identifier associated with the first user device.

7. The system of claim 5, where the request further includes the first timestamp and a request for the first location information associated with the first user device at a time associated with the first timestamp.

8. The system of claim 5, where the first server is further to:
receive a particular request from a fourth server,
the particular request including:

a request for information to identify one or more second user devices located in a particular geographic area, and
information to identify the particular geographic area, and
the one or more second user devices being associated with one or more third identifiers and one or more fourth identifiers to anonymize the one or more third identifiers from the third server;
provide the information to identify the particular geographic area to the third server as a request for the one or more fourth identifiers associated with the one or more second user devices located in the particular geographic area;
receive, from the third server, the one or more fourth identifiers based on providing the information to identify the particular geographic area;
determine one or more third identifiers corresponding to the one or more fourth identifiers based on information stored by the first server mapping the one or more fourth identifiers to the one or more third identifiers; and
provide the one or more third identifiers to the fourth server,
the fourth server being capable of providing a second location-based service to the one or more second user devices based on the one or more third identifiers.

9. A method comprising:
receiving, by a first server and from a second server, a request for user device information,
the request for the user device information including:
a request for information to identify one or more first user devices located in a particular geographic area, and
information to identify the particular geographic area,
the one or more first user devices being associated with one or more first identifiers and one or more second identifiers to anonymize the one or more first identifiers from a third server that stores particular information associated with the one or more first user devices, and
the particular information including:
first location information associated with a particular second identifier, of the one or more second identifiers, and a first timestamp, and
the first location information identifying a location within the particular geographic area,
second location information associated with the particular second identifier and a second timestamp;
providing, by the first server to the third server, the information to identify the particular geographic area as a request for the one or more second identifiers associated with the one or more first user devices located in the particular geographic area based on receiving the request for the user device information from the second server,
the information to identify the particular geographic area permitting the third server to identify the one or more second identifiers;
receiving, by the first server and from the third server, the one or more second identifiers based on providing the information to identify the particular geographic area;
determining, by the first server, the one or more first identifiers corresponding to the one or more second identifiers based on information stored by the first server mapping the one or more second identifiers to the one or more first identifiers; and
providing, by the first server, the one or more first identifiers to the second server,
the second server being capable of providing a first location-based service to the one or more first user devices based on the one or more first identifiers.

10. The method of claim 9, further comprising:
receiving communication data associated with the one or more first user devices;
determining the first location information associated with a particular first user device, of the one or more first user devices, based on receiving the communication data;
generating the one or more second identifiers corresponding to the one or more first user devices; and
providing the first location information and the one or more second identifiers to the third server to allow the third server to store the first location information associated with the particular second identifier without allowing the third server to identify the one or more first identifiers,
where determining the one or more first identifiers is based on generating the one or more second identifiers and mapping the one or more second identifiers to the one or more first identifiers.

11. The method of claim 9,
where the request for user device information includes the first timestamp and a request for information to identify the one or more first user devices located in the particular geographic area at a time associated with the first timestamp, and
where receiving the one or more second identifiers from the third server is based on the third server identifying the one or more second identifiers based on information associated with the first timestamp and based on the information to identify the particular geographic area.

12. The method of claim 9, further comprising:
receiving a particular request from a fourth server,
the particular request including:
a request for particular location information associated with a second user device, and
a third identifier associated with the second user device, and
the second user device being associated with a fourth identifier to anonymize the third identifier from the third server;
determining the fourth identifier associated with the second user device based on information stored by the first server mapping the fourth identifier to the third identifier;
providing, to the third server, the fourth identifier to request the particular location information;
receiving, from the third server, the particular location information associated with the fourth identifier based on providing the fourth identifier to the third server; and
providing, to the fourth server, the particular location information associated with the fourth identifier and the third identifier based on receiving the particular location information from the third server,
the fourth server being capable of providing a second location-based service to the second user device based on receiving the particular location information from the first server.

13. A system comprising:
a first server to:
receive, from a second server, a request for user device information,
the request for the user device information including,
a request for information to identify one or more first user devices located in a particular geographic area, and
information to identify the particular geographic area,
the one or more first user devices being associated with one or more first identifiers and one or more second identifiers to anonymize the one or more first identifiers from a third server that stores particular information associated with the one or more first user devices, and
the particular information including:
first location information associated with a particular second identifier, of the one or more second identifiers, and a first timestamp, and
the first location information identifying a location within the particular geographic area,
second location information associated with the particular second identifier and a second timestamp;
provide, to the third server, the information to identify the particular geographic area as a request for the one or more second identifiers associated with the one or more first user devices located in the particular geographic area,
the information to identify the particular geographic area permitting the third server to identify the one or more second identifiers;
receive, from the third server, the one or more second identifiers based on providing the information to identify the particular geographic area;
determine one or more first identifiers corresponding to the one or more second identifiers based on information stored by the first server mapping the one or more second identifiers to the one or more first identifiers;
determine that the second server is permitted to receive the one or more first identifiers based on information stored by the one or more first user devices indicating that the second server is permitted to receive the one or more first identifiers; and
provide the one or more first identifiers to the second server based on determining that the second server is permitted to receive the one or more first identifiers,
the second server being capable of providing a first location-based service to the one or more first user devices based on the one or more first identifiers.

14. The system of claim 13,
where the first server is further to:
receive communication data associated with the one or more first user devices;
determine the first location information based on receiving the communication data;
generate the one or more second identifiers corresponding to the one or more first user devices; and
provide the first location information and the one or more second identifiers to the third server to allow the third server to store the first location information without allowing the third server to identify the one or more first identifiers, and
where, when determining the one or more first identifiers, the first server is to:
determine the one or more first identifiers based on generating the one or more first identifiers and mapping the one or more second identifiers to the one or more first identifiers.

15. The system of claim 13, where the request for user device information includes the first timestamp and a request for information to identify the one or more first user devices located in the particular geographic area at a time associated with the first timestamp.

16. The system of claim 13, where the first server is further to:
receive a particular request from a fourth server,
the particular request including:
a request for particular location information associated with a second user device, and
a third identifier associated with the second user device, and
the second user device being associated with a fourth identifier to anonymize the third identifier from the third server;
determine the fourth identifier associated with the second user device based on information stored by the first server mapping the fourth identifier to the third identifier;
provide, to the third server, the fourth identifier to request the particular location information associated with the fourth identifier from the third server;
receive, from the third server, the particular location information associated with the fourth identifier based on providing the fourth identifier to the third server; and
provide, to the fourth server, the particular location information associated with the fourth identifier and the third identifier based on receiving the particular location information from the third server,
the fourth server being capable of providing a second location-based service to the second user device based on receiving the particular location information from the first server.

17. A non-transitory computer-readable medium for storing instructions, the instructions comprising:
a plurality of instructions which, when executed by one or more processors associated with a first server, cause the one or more processors to:
receive, from a second server, a request for user device information,
the request including a first identifier associated with a first user device or information to identify one or more second user devices located in a particular geographic area,
the first user device being associated with a second identifier to anonymize the first identifier from a third server that stores particular information associated with the first user device, and
the particular information including:
first location information associated with the second identifier and a first timestamp, and
second location information associated with the second identifier and a second timestamp, and
the one or more second user devices being associated with one or more third identifiers and one or more fourth identifiers to anonymize the one or more third identifiers from the third server; and
determine whether the request for the user device information is a request for the first location information or a request for the information to identify the one or more second user devices located in the particular geographic area;

when the request for the user device information is the request for the first location information, the plurality of instructions cause the one or more processors to:

determine the second identifier associated with the first user device based on information stored by the first server mapping the second identifier to the first identifier;

provide, to the third server, the second identifier to request the first location information associated with the second identifier from the third server;

receive, from the third server, the first location information associated with the second identifier based on providing the second identifier to the third server; and provide, to the second server, the first location information associated with the second identifier and the first identifier based on receiving the first location information from the third server, the second server being capable of providing a first location-based service to the first user device based on receiving the first location information from the first server;

when the request for the user device information is the request for the information to identify the one or more second user devices located in the particular geographic area, the plurality of instructions cause the one or more processors to:

provide, to the third server, the information to identify the particular geographic area as a request for the one or more fourth identifiers, the information to identify the particular geographic area permitting the third server to identify the one or more fourth identifiers;

receive, from the third server, the one or more fourth identifiers based on providing the information to identify the particular geographic area;

determine the one or more third identifiers corresponding to the one or more fourth identifiers based on information stored by the first server mapping the one or more fourth identifiers to the one or more third identifiers; and provide the one or more third identifiers to the second server, the second server being capable of providing a second location-based service to the one or more second user devices based on the one or more third identifiers.

18. The non-transitory computer-readable medium of claim 17, where the request for user device information includes the first timestamp.

19. The non-transitory computer-readable medium of claim 17, where the first location-based service is a geo-tagging service.

20. The non-transitory computer-readable medium of claim 17, where the second location-based service is a messaging service associated with sending a message to the one or more second user devices.

* * * * *